US008838153B2

(12) United States Patent
Hubner et al.

(10) Patent No.: US 8,838,153 B2
(45) Date of Patent: Sep. 16, 2014

(54) NETWORK PROVIDING GEO-TAGGED DATA

(75) Inventors: Paul Hubner, McKinney, TX (US);
Steven T. Archer, Dallas, TX (US);
Robert A. Clavenna, Lucas, TX (US);
Kristopher Pate, Sasche, TX (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 622 days.

(21) Appl. No.: 12/633,897

(22) Filed: Dec. 9, 2009

(65) Prior Publication Data
US 2011/0136502 A1 Jun. 9, 2011

(51) Int. Cl.
*H04W 24/00* (2009.01)
*H04W 4/18* (2009.01)
*H04W 4/02* (2009.01)

(52) U.S. Cl.
CPC ............... *H04W 4/02* (2013.01); *H04W 4/185* (2013.01)
USPC ..................................... 455/456.6; 455/456.1

(58) Field of Classification Search
CPC ......... H04W 64/00; H04W 4/02; H04W 4/22; H04W 4/021; H04L 29/08657
USPC ................. 455/456.1–457, 404.2, 414.1, 566
See application file for complete search history.

(56) References Cited

U.S. PATENT DOCUMENTS

| 6,785,551 | B1 * | 8/2004 | Richard | 455/456.1 |
|---|---|---|---|---|
| 7,515,041 | B2 * | 4/2009 | Eisold et al. | 340/506 |
| 8,014,762 | B2 * | 9/2011 | Chmaytelli et al. | 455/414.1 |
| 2007/0149208 | A1 * | 6/2007 | Syrbe et al. | 455/456.1 |
| 2009/0111487 | A1 * | 4/2009 | Scheibe | 455/456.6 |

* cited by examiner

*Primary Examiner* — Marcos Torres

(57) ABSTRACT

A method includes receiving geo-tagged data by a user device, wherein the geo-tagged data includes information tagged with geographic data; determining a geographic location of the user device; comparing the geographic data with the geographic location; determining whether the information is to be provided to a user associated with the user device based on the comparing; and providing the information to the user when the geographic location is within a geographic region indicated by the geographic data.

20 Claims, 14 Drawing Sheets

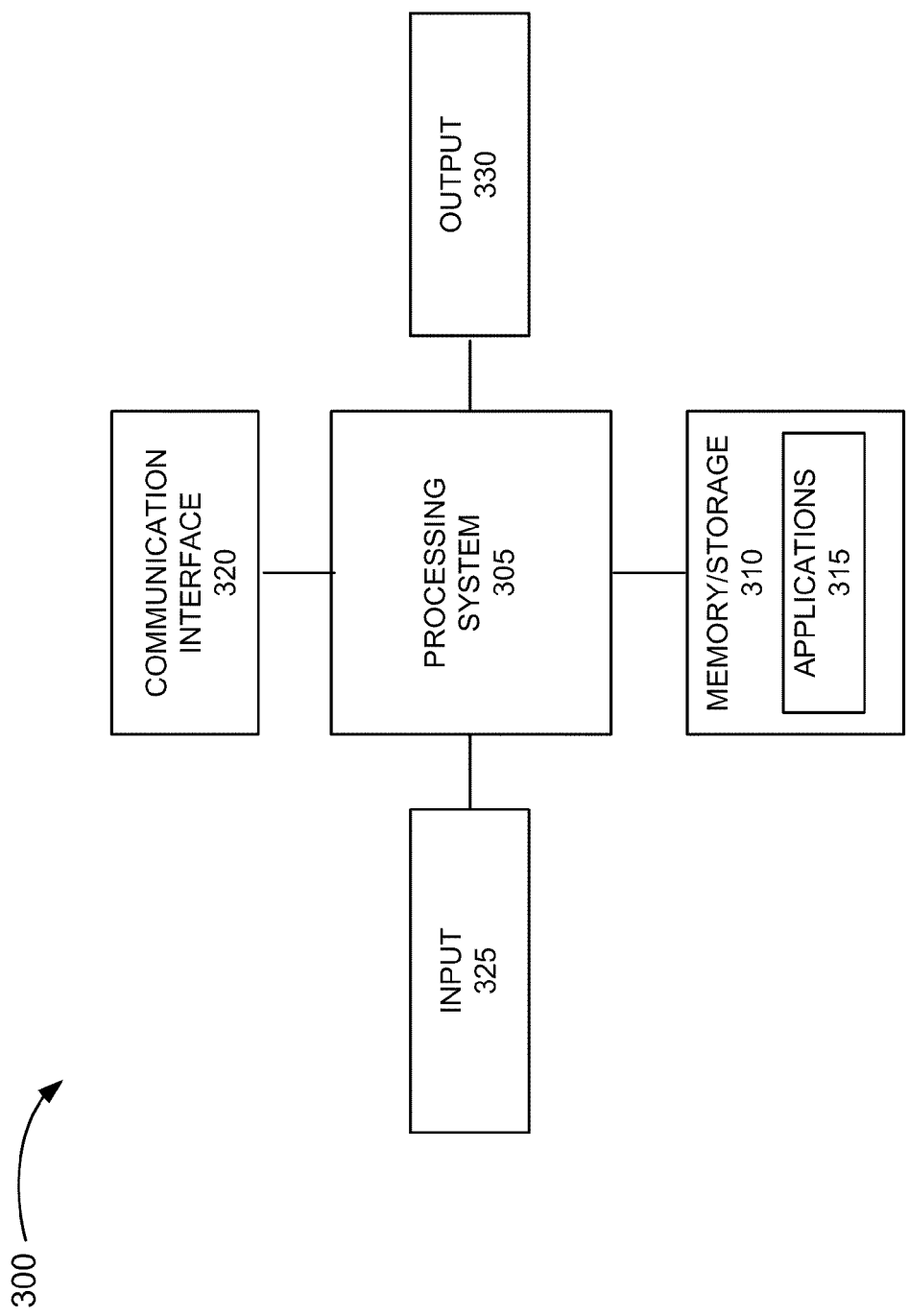

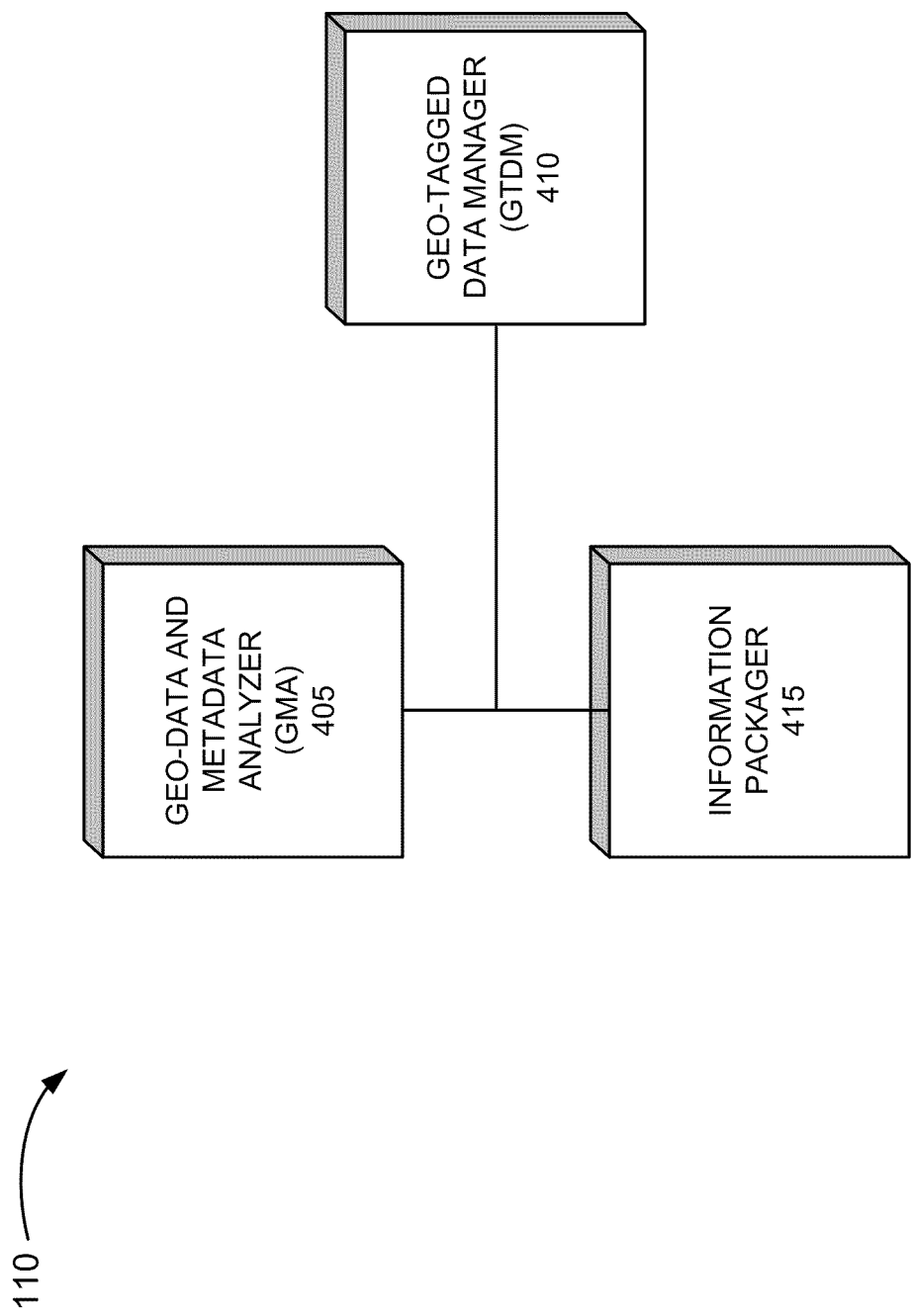

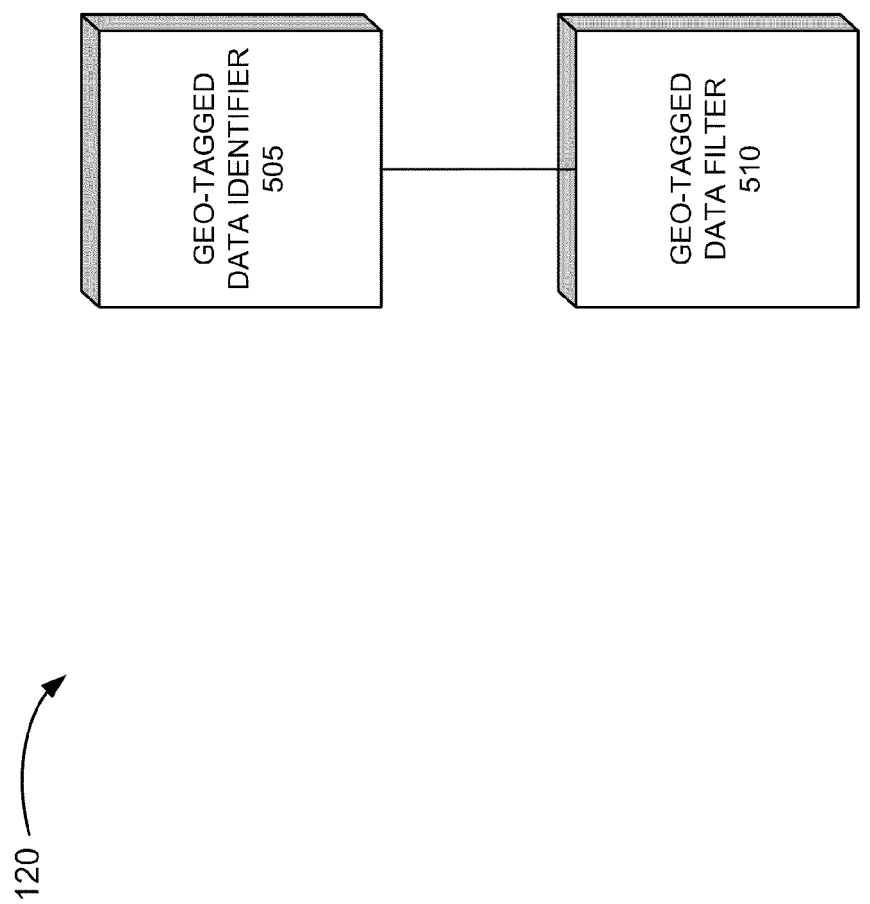

NETWORK PROVIDING GEO-TAGGED DATA

BACKGROUND

Users of mobile devices may receive various types of information (e.g., news, sports, weather, personal, etc.) in a variety of formats (e.g., e-mail, the Web, feeds, etc.). Additionally, mobile devices may provide users with their geographic location.

BRIEF DESCRIPTION OF THE DRAWINGS

FIG. 3 is a diagram illustrating exemplary components of a device that may correspond to one or more of the devices in the exemplary environment;

FIG. 4 is a diagram illustrating exemplary functional components associated with an exemplary implementation of a server;

FIG. 5 is a diagram illustrating exemplary functional components associated with an exemplary implementation of a user device;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "geo-tagged data," as used herein, is to be broadly interpreted to include information that may include geographic data. By way of example, but not limited thereto, weather information, news information, sports information, advertising information (e.g., from retailers, grocery stores, restaurants, etc), police-based information (e.g., America's Missing Broadcast Emergency Response (AMBER) alerts, high-speed pursuit predictions, etc.), traffic information (e.g., congestion, re-routing, accidents, etc.), and/or user-generated information (e.g., speed traps, news, merchandise sales, etc.) may be tagged with geographic data. For example, the geographic data may indicate a geographic region. By way of example, but not limited thereto, the geographic region may correspond to the United States of America, a coastal region (e.g., eastern coast, etc.), a group of states, a state, a city, a county, a neighborhood, and/or some other geographic region in which geo-tagged data may be received by users. In addition to geographic data, geo-tagged data may include metadata. By way of example, but not limited thereto, the metadata may include time sensitive information (e.g., a start time, an end time (i.e., an expiration time), etc.), date information, and classification data. The classification data may categorize the type of information tagged with the geographic data. For example, as previously described, the information may be categorized as weather information, news information, etc.

It will be appreciated that a variety of technologies or techniques (e.g., a Global Positioning System (GPS), cellular positioning methods (e.g., triangulation, etc.), local positioning methods (e.g., Bluetooth, IEEE 802.11, Ultra Wide Band, etc.)) exist to identify a geographic position of the user device (and the user). However, these technologies may provide the geographic position of the user device (and the user) with different degrees of precision or accuracy. While, the GPS is a popular technology that enables the user device to obtain geographic positional information, the GPS typically does not work well inside buildings or underground due to an absence of line of sight to satellites and attenuation and scattering of signals caused by roofs, walls, and other objects. In this regard, other technologies, such as, for example, an indoor positioning system (IPS) may be utilized. Thus, while the description that follows may describe embodiments that utilize the GPS, it will be appreciated that other technologies or techniques may be utilized to obtain the geographic position of the user device (and the user).

Figure 1A:
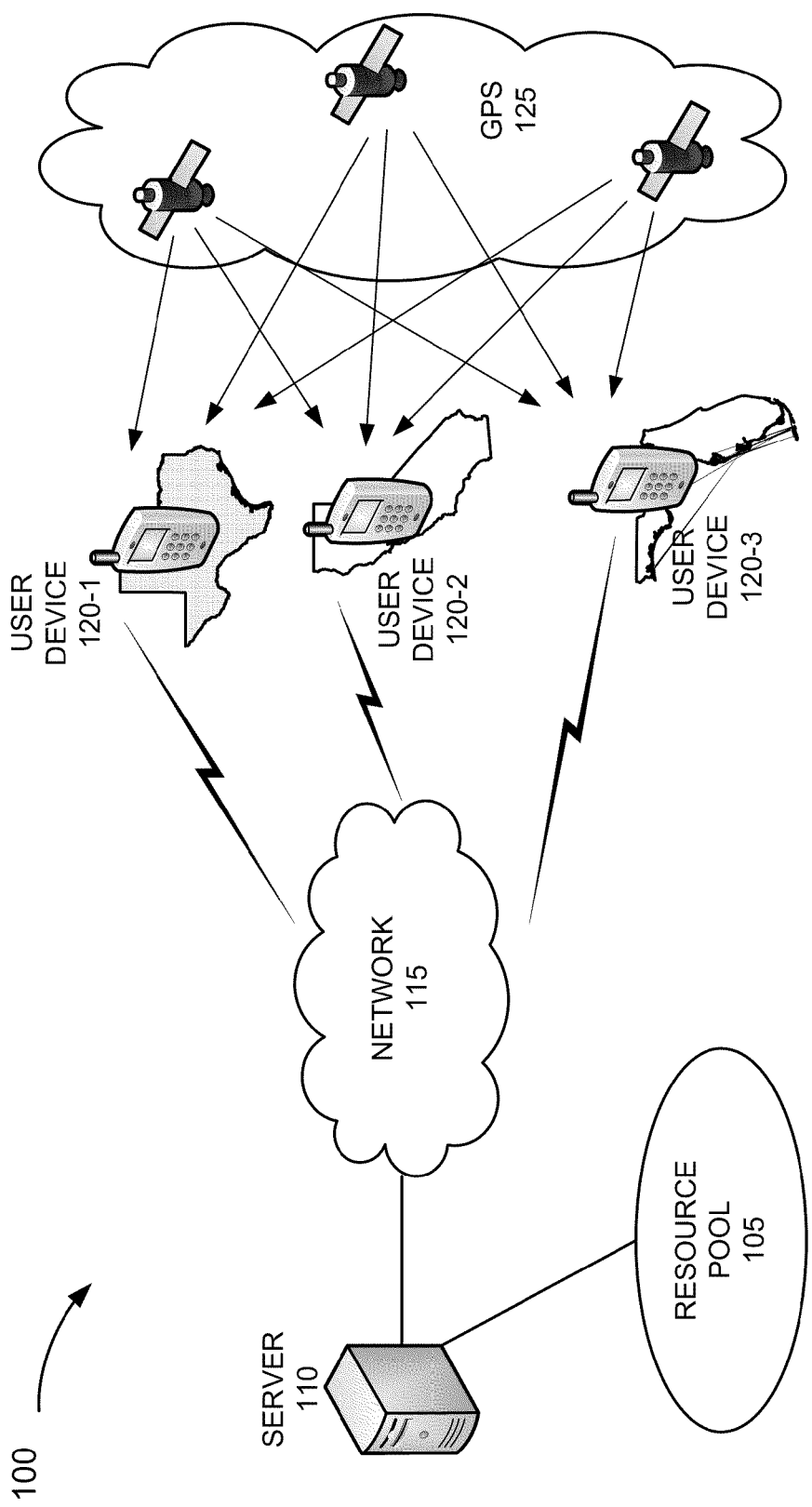
FIG. 1A is a diagram illustrating an exemplary environment in which geo-tagged data may be implemented.

FIG. 1A is a diagram illustrating an exemplary environment 100 in which geo-tagged data may be implemented. As illustrated in FIG. 1A, exemplary environment 100 may include a resource pool 105, a server 110, a network 115, user devices 120-1 through 120-3 (referred to generally as user device 120 or user devices 120), and a GPS 125.

The number of devices and configuration in environment 100 is exemplary and provided for simplicity. In practice, environment 100 may include more devices, fewer devices, different devices, and/or differently arranged devices than those illustrated in FIG. 1A. Additionally, or alternatively, environment 100 may include additional networks, fewer networks, and/or different networks than those illustrated in FIG. 1A. For example, in other implementations, environment 100 may include not include GPS 125. Alternatively, server 110 may be a part of network 115. Also, some functions described as being performed by a particular device may be performed by a different device or a combination of devices. Environment 100 may include wired and/or wireless connections among the devices illustrated.

Resource pool 105 may correspond to sources of information. By way of example, but not limited thereto, the sources of information may include the Web, publicly available information (e.g., AMBER alerts, public news servers, Associated Press (AP) news wires, public weather services, public/private sports services, etc.), user generated data (e.g., users uploading information, such as reporting a speed trap, an accident, specials at a local restaurant, etc.), web feeds (e.g., a Really Simple Syndication (RSS) feed, an Atom feed, etc.), proprietary information (e.g., information provided by a network operator or a service provider), etc.

Server 110 may include one or more devices having the capability to communicate with other devices, systems, networks, and/or the like. For example, server 110 may include one or more network devices (e.g., computers, servers, etc.).

Network 115 may include one or more networks of any type. By way of example, but not limited thereto, network 115 may include a local area network (LAN), a wide area network (WAN), a telephone network, such as a Public Switched Telephone Network (PSTN) or a Public Land Mobile Network (PLMN), a data network, the Internet, an intranet, a person area network (PAN), and/or some other type of wired and/or wireless networks, or combination thereof.

User device 120 may include a device having the capability to communicate with other devices, systems, networks, and/or the like. By way of example, but not limited thereto, user device 120 may correspond to a mobile telephone, a computer (e.g., a laptop, a palmtop, etc.), a personal digital assistant (PDA), a personal communication system (PCS) terminal, a pervasive computing device, and/or some other type of portable device, mobile device, handheld device, and/or vehicle-based device. GPS 125 may include a constellation of satellites that provide location-based services.

Figure 1B:
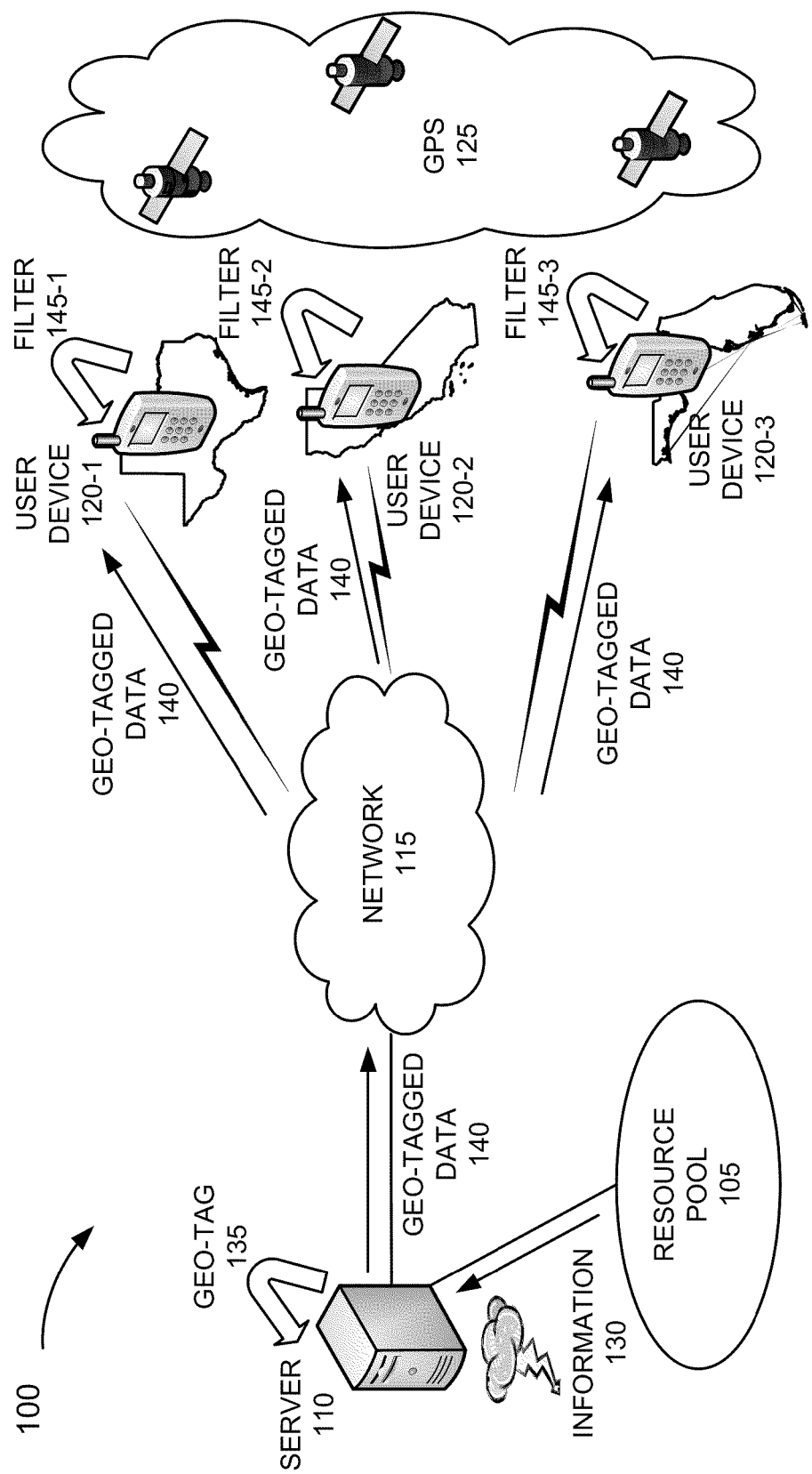
FIG. 1B is a diagram illustrating an exemplary embodiment in which geo-tagged data may be provided to a user in the exemplary environment depicted in FIG. 1A.

In an exemplary embodiment, geo-tagged data may be provided to user devices 120. For example, as illustrated in FIG. 1B, server 110 may receive information 130 from resource pool 105. In an exemplary case, information 130 may include weather information (e.g., a severe thunderstorm warning). The severe thunderstorm warning may pertain to a region in the state of Texas and the thunderstorm warning may be valid for approximately 2 hours. Server 110 may examine information 130 and identify geographic data and metadata. Server 110 may geo-tag 135 information 130 with geographic data (e.g., a region in the state of Texas) and metadata (e.g., that the thunderstorm warning is valid for approximately 2 hours). Server 110 may provide geo-tagged data 140 to network 115.

In an exemplary implementation, network 115 may utilize a common broadcast data channel to broadcast, multicast, etc., geo-tagged data 140 to users. Depending on network operator policies, classification of information (e.g., weather, news, etc.), network resource utilization factors, etc., network 115 may broadcast to all users or only to a portion of users. In this exemplary case, it may be assumed that geo-tagged data 140 may be broadcast to all users in the United States. As illustrated in FIG. 1B, network 115 may broadcast geo-tagged data 140 to various regions of the United States. For example, user device 120-1 may be situated in the state of Texas, user device 120-2 may be situated in the state of California, and user device 120-3 may be situated in the state of Florida.

When user devices 120 receive geo-tagged data 140, user devices 120 may determine whether geo-tagged data 140 should be provided to the users. In an exemplary implementation, user device 120 may obtain a location of user device 120 based on GPS 125. User device 120 may determine whether geo-tagged data 140 should be provided to the user based on comparing the location of user device 120 with the geographic data associated with geo-tagged data 140. In the instance that user device 120 is located within the region indicated by the geographic data, user device 120 may provide geo-tagged data 140 to the user. In this exemplary case, since geo-tagged data 140 includes metadata (e.g., a 2 hour time window), user device 120 may also determine whether geo-tagged data 140 should be provided to the user based on the current time associated with user device 120.

For purposes of discussion, the determining performed by user device 120 as to whether geo-tagged data 140 should be provided to the user may be characterized as a filtering process. Referring to FIG. 1B, as illustrated, user devices 120-1, 120-2, and 120-3 may filter 145-1, 145-2, and 145-3, respectively, geo-tagged data 140. Based on filtering 145, it may be assumed that user device 120-1 may determine that geo-tagged data 140 should be provided to the user, while user devices 120-2 and 120-3 may determine that geo-tagged data 140 should not be provided to the users.

In this exemplary scenario, user device 120 may provide geo-tagged data 140 to the user by displaying geo-tagged data and/or may provide some other type of output. For example, user device 120 may provide geo-tagged data 140 in an auditory form (e.g., a vocalization of geo-tagged data 140) or some other type of auditory output (e.g., an auditory alert or cue) to the user. Additionally, or alternatively, user device 120 may provide a tactile output (e.g., a vibratory cue). Depending on the information (e.g., news, sports, weather, etc.) included with geo-tagged data, the information may be provided to the user as a feed, a text message, a video or some other type of multimedia message (e.g., a recorded message, etc.), etc.

Since an exemplary embodiment has been broadly described, a more detailed description of this embodiment and other exemplary embodiments are provided below. For example, in other embodiments, network devices in network 115 may filter geo-tagged data 140 before transmitting geo-tagged data towards users. Additionally, or alternatively, user device 120 may consider other parameters (e.g., user preferences) when determining whether to provide geo-tagged data 140 to the user.

As previously described, network 115 may include a wireless network. In such an implementation, network devices may perform filtering with respect to geo-tagged data. The term "wireless network," as used herein, is intended to be broadly interpreted to include cellular networks, non-cellular networks, or mobile networks. By way of example, but not limited thereto, network 115 may include a GSM network, a Universal Mobile Telecommunication System (UMTS) network, an LTE network, a Wideband Code Division Multiple Access (WCDMA) network, an Ultra Mobile Broadband (UMB) network, a High-Speed Packet Access (HSPA) network, an ad hoc network, a Worldwide Interoperability for Microwave Access (WiMAX) network, an Institute of Electrical and Electronics Engineers (IEEE) 802.X network, and/or another type of wireless network (e.g., an Internet Protocol (IP) Multimedia Subsystem (IMS) network, etc.).

Given the wide variety of wireless networks that may be implemented in various embodiments, for purposes of description, wireless networks, such as, a GSM/GPRS network and an LTE network are described, in which exemplary embodiments may be implemented. It will be appreciated that the number of devices and configurations in the GSM/GPRS network and the LTE network are exemplary and provided for simplicity. In practice, the GSM/GPRS network and the LTE network may include additional devices, fewer devices, different devices, and/or differently arranged devices than those illustrated in FIGS. 2A-2D and described. For example, although not illustrated and described, the GSM/GPRS network may include a visitor location register (VLR), a home location register (HLR), a gateway mobile switching center (GMSC), etc.

Figure 2A:
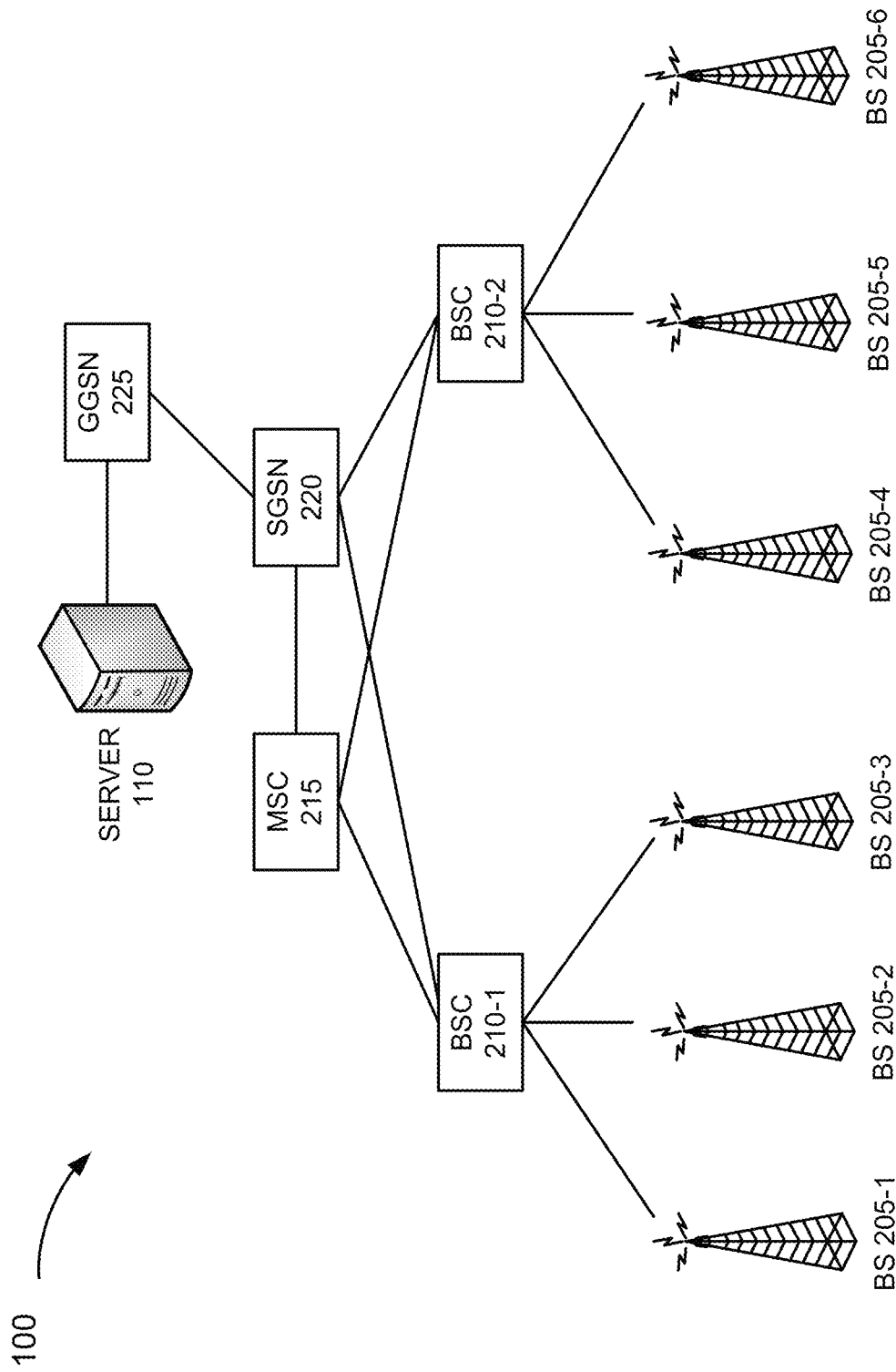
FIG. 2A is a diagram illustrating an exemplary Global System for Mobile Communications (GSM)/General Packet Radio Service (GPRS) (GSM/GPRS) network.

FIG. 2A is a diagram illustrating an exemplary GSM/GPRS network. As illustrated in FIG. 2A, the GSM/GPRS network may include base stations (BSs) 205-1 through 205-6 (referred to generally as BSs 205 or BS 205), base station controllers (BSCs) 210-1 and 210-2 (referred to generally as BSCs 210 or BSC 210), a mobile switching center (MSC) 215, a serving GPRS support node (SGSN) 220, and a gateway GPRS support node (GGSN) 225. BS 205, BSC 210, MSC 215, SGSN 220, and GGSN 225 may operate according to one or more GSM/GPRS network standards. In addition, as described below, one or more of these network devices may filter geo-tagged data as the geo-tagged data propagates toward users.

Figure 2B:
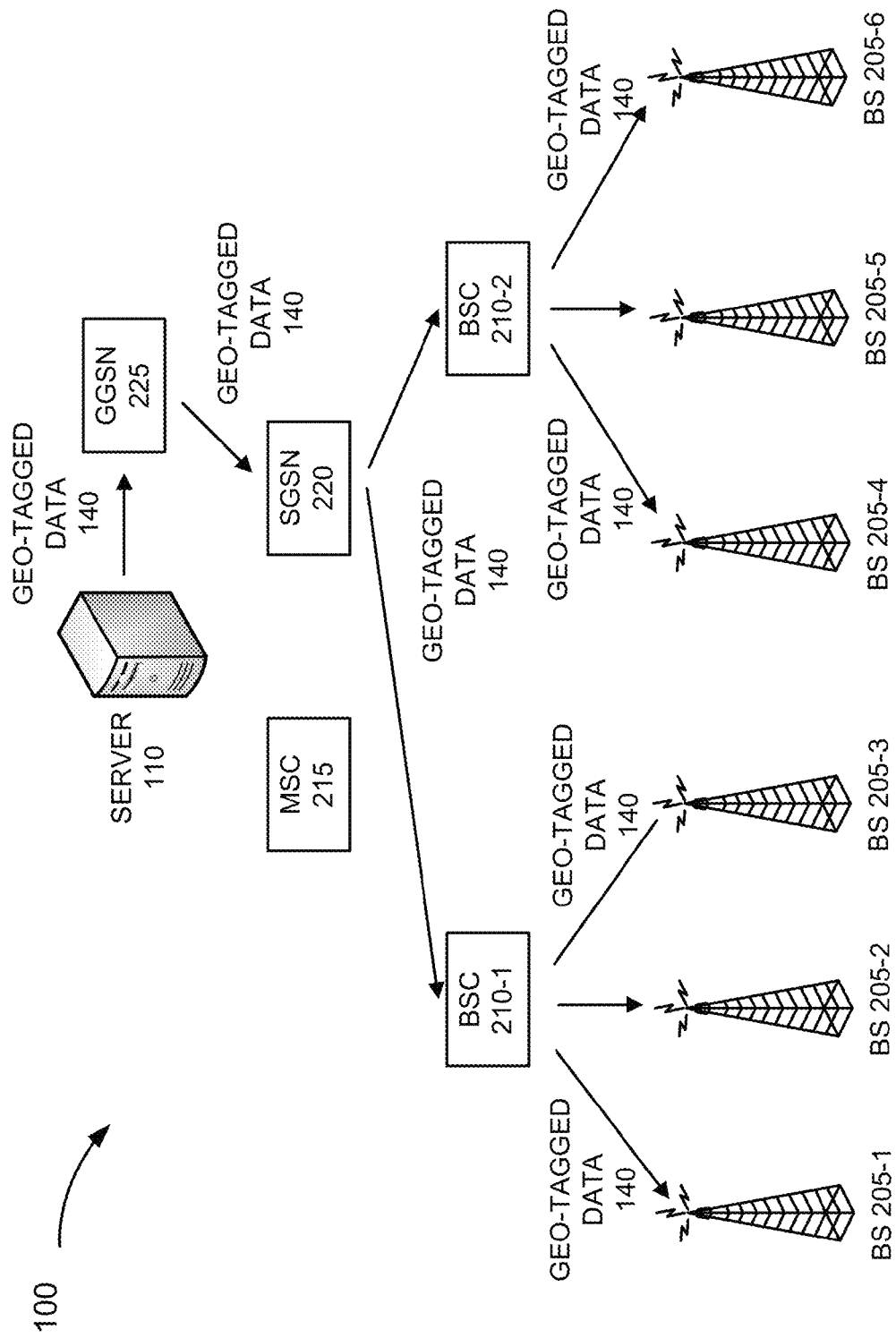
FIG. 2B is a diagram illustrating an exemplary embodiment in which geo-tagged data may propagate in the exemplary GSM/GPRS network depicted in FIG. 2A.

Referring to FIG. 2B, in an exemplary implementation, server 110 may transmit (directly or indirectly) geo-tagged data 140 to GGSN 225. When geo-tagged data 140 is received, GGSN 225 may determine whether to transmit geo-tagged 140 to SGSN 220. For example, GGSN 225 may compare a geographic region in which GGSN 225 serves to the geographic data associated with geo-tagged data 140. When GGSN 225 determines that the geographic data is within the geographic region in which GGSN 225 serves, GGSN 225 may transmit geo-tagged data 140 to SGSN 220. When GGSN 225 determines that the geographic data is not within the geographic region in which GGSN 225 serves, GGSN 225 may not transmit geo-tagged data 140 to SGSN 220. In such an instance, GGSN 225 may discard geo-tagged data 140.

GGSN 225 may also evaluate metadata associated with geo-tagged data 140. In this example, it may be assumed that GGSN 225 determines to transmit geo-tagged data 140 to SGSN 220. As geo-tagged data 140 propagates toward user device(s) 120 via SGSN 220, BSCs 210, and BSs 205, SGSN 220, BSCs 210, and/or BSs 205 may perform similar filtering of geo-tagged data 140. For example, in an exemplary scenario, it may be assumed that geo-tagged data 140 is sent to all users attached to BSs 205 after filtering had been performed.

Figure 2C:
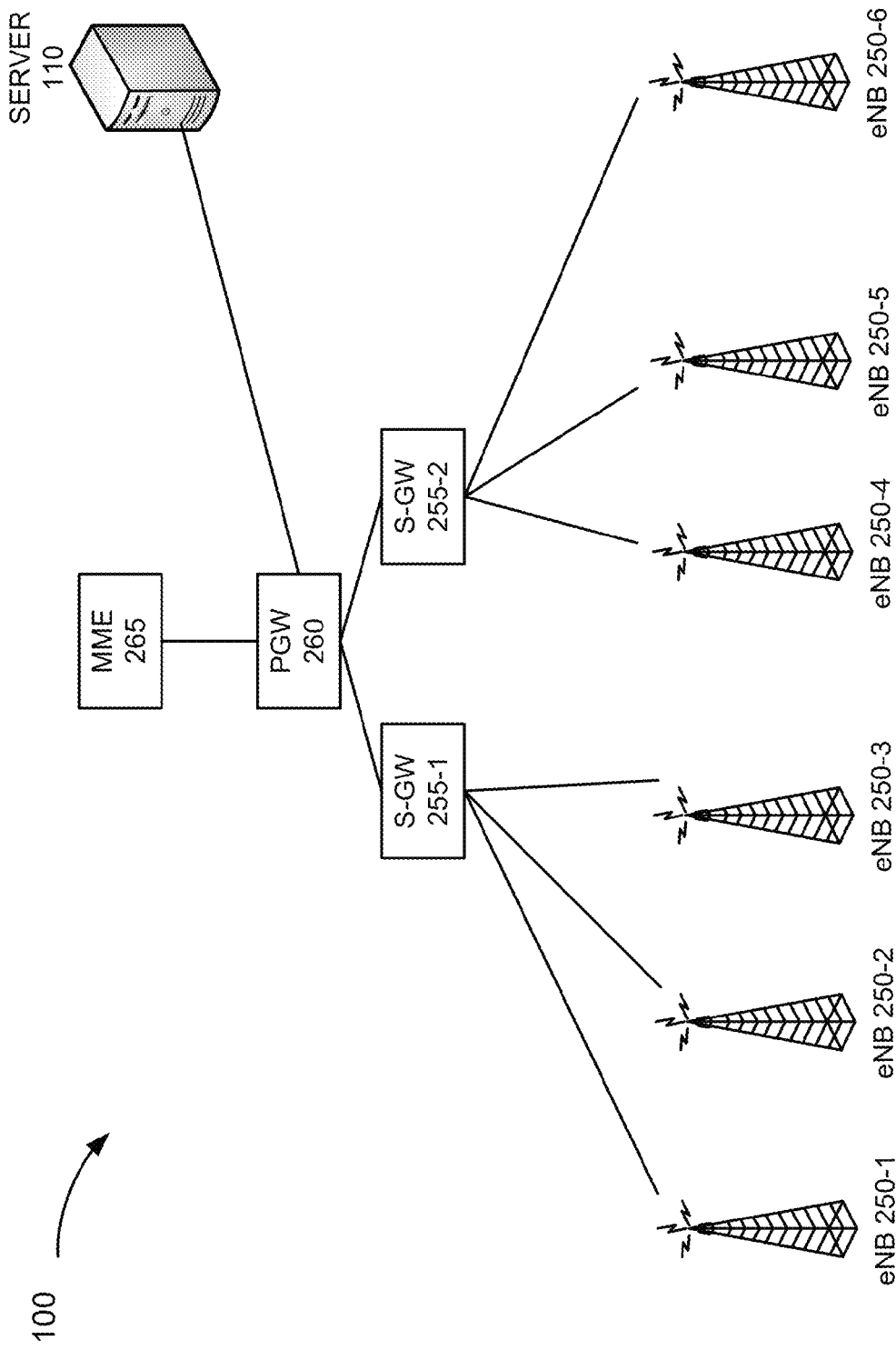
FIG. 2C is a diagram illustrating an exemplary Long Term Evolution (LTE) network.

FIG. 2C is a diagram illustrating an exemplary LTE network. As illustrating in FIG. 2C, the LTE network may include evolved Node-Bs (eNBs) 250-1 through 250-6 (referred to generally as eNBs 250 or eNB 250), serving gateways (S-GWs) 255-1 and 255-2 (referred to generally as S-GWs 255 or S-GW 255), a packet data network (PDN) gateway (PGW) 260, and a mobility management entity (MME) 265. In an exemplary implementation of the LTE communication standard, S-GW 255, PGW 260, and MME 265 may form an Evolved Packet Core (EPC) network. ENBs 250, S-GWs 255, PGW 260 and MME 265 may operate according to one or more LTE network standards. In addition, as described below, one or more of these network devices may filter geo-tagged data as the geo-tagged data propagates toward users.

Figure 2D:
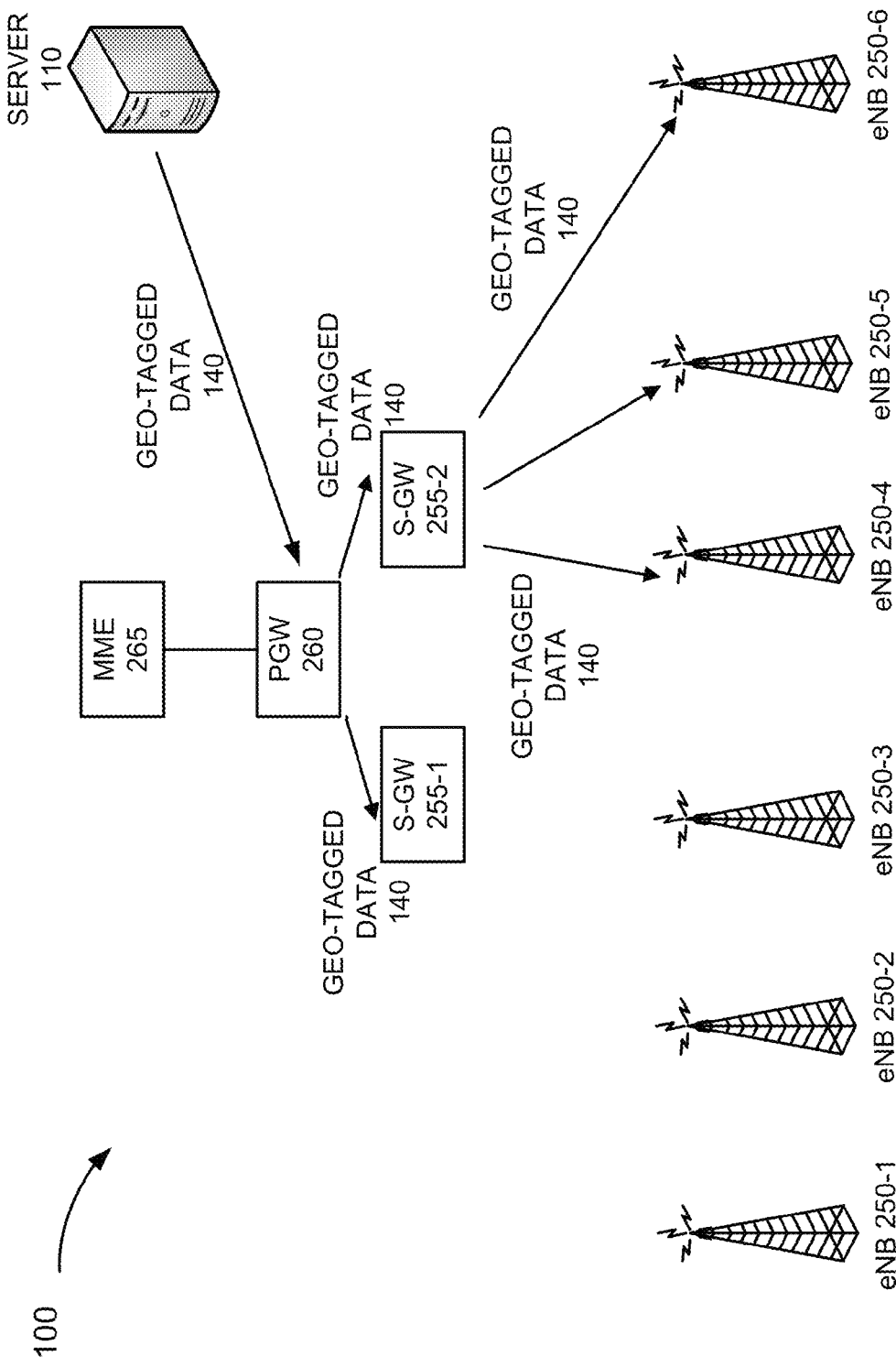
FIG. 2D is a diagram illustrating an exemplary embodiment in which geo-tagged data may propagate in the exemplary LTE network depicted in FIG. 2C.

Referring to FIG. 2D, in an exemplary implementation, server 110 may transmit (directly or indirectly) geo-tagged data 140 to PGW 260. When geo-tagged data 140 is received, PGW 260 may determine whether to transmit geo-tagged 140 to S-GWs 255. For example, PGW 260 may compare a geographic region in which PGW 260 serves to the geographic data associated with geo-tagged data 140. When PGW 260 determines that the geographic data is within the geographic region in which PGW 260 serves, PGW 260 may transmit geo-tagged data 140 to S-GWs 255. When PGW 260 determines that the geographic data is not within the geographic region in which PGW 260 serves, PGW 260 may not transmit geo-tagged data 140 to S-GWs 255. In such an instance, PGW 260 may discard geo-tagged data 140.

PGW 260 may also evaluate metadata associated with geo-tagged data 140. In this example, it may be assumed that PGW 260 determines to transmit geo-tagged data 140 to SGWs 255. As geo-tagged data 140 propagates toward user device(s) 120 via S-GWs 255 and eNBs 250, S-GWs 255 and/or eNBs 250 may perform similar filtering of geo-tagged data 140. For example, in an exemplary scenario, it may be assumed that S-GW 255-1 determines not to transmit geo-tagged data 140 to eNBs 250-1 through 250-3, while S-GW 255-2 determines to transmit geo-tagged data 140 to eNBs 250-4 through 250-6.

Although FIGS. 2A-2D illustrate exemplary implementations for filtering geo-tagged data 140 by network devices in network 115, in other implementations, different processes than those described may be performed. For example, in other implementations, one or more network devices may not perform filtering as geo-tagged data 140 propagates from a back-end of the wireless network (e.g., GGSN 225, PGW 260) toward a front end of the wireless network (e.g., BS 205, eNB 250, etc.).

FIG. 3 is a diagram illustrating exemplary components of a device 300 that may correspond to one or more of the devices in environment 100. For example, device 300 may correspond to server 110, user device 120, as well as one or more of the network devices in network 115 (e.g., BS 205, eNB 250, BSC 210, S-GW 255, etc.). As illustrated, device 300 may include a processing system 305, memory/storage 310 including applications 315, a communication interface 320, an input 325, and an output 330. In other implementations, device 300 may include fewer components, additional components, different components, and/or a different arrangement of components than those illustrated in FIG. 3 and described herein.

Processing system 305 may include one or more processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 305 may control the overall operation, or a portion thereof, of device 300, based on, for example, an operating system and/ or various applications (e.g., applications 315).

Memory/storage 310 may include one or more memories and/or one or more secondary storages. For example, memory/storage 310 may include a random access memory (RAM), a dynamic random access memory (DRAM), a read only memory (ROM), a programmable read only memory (PROM), a flash memory, and/or some other type of memory. Memory/storage 310 may include a hard disk (e.g., a magnetic disk, an optical disk, a magneto-optic disk, a solid state disk, etc.) or some other type of computer-readable medium, along with a corresponding drive. Memory/storage 310 may include a memory, a storage device, or storage component that is external to and/or removable from device 300, such as, for example, a Universal Serial Bus (USB) memory stick, a hard disk, mass storage, off-line storage, etc.

The term "computer-readable medium," as used herein, is intended to be broadly interpreted to include, for example, a memory, a storage device (e.g., a hard disk and corresponding drive), a compact disc (CD), a digital versatile disc (DVD), or the like. The computer-readable medium may be implemented in a single device, in multiple devices, in a centralized manner, or in a distributed manner. Memory/storage 310 may store data, application(s), and/or instructions related to the operation of device 300.

Applications 315 may include software that provides various services or functions. For example, with reference to user device 120, applications 315 may include an e-mail application, a telephone application, a camera application, a voice recognition application, a multi-media application, a visual voicemail application, a contacts application, a data organizer application, an instant messaging application, a texting application, a web browsing application, etc. Additionally, with reference to user device 120, applications 315 may include one or more applications for filtering geo-tagged data.

With reference to server 110, applications 315 may include one or more applications for receiving and/or collecting information from resource pool 105. Additionally, with reference to server 110, applications 315 may include one or more applications for examining information received from resource pool 105 and identifying geographic data and metadata. Additionally, with reference to server 110, applications 315 may include one or more applications for geo-tagging the information. For example, applications 315 may insert geographic data and metadata into particular fields of a packet. The term "packet," as used herein, is intended to be broadly interpreted to include any form of a data transmission. By way of example, but not limited thereto, a packet may take the form of an IP packet, a cell, a frame, etc., or a portion thereof. With reference to network devices in network 115, applications 315 may include one or more applications for filtering geo-tagged data.

Communication interface 320 may permit device 300 to communicate with other devices, networks, systems and/or the like. Communication interface 320 may include one or more wireless interfaces and/or wired interfaces.

Input 325 may permit an input into device 300. For example, input 325 may include a button, a keypad, a knob, a touchpad, a keyboard, an input port, a display, a microphone, voice recognition logic, fingerprint recognition logic, a web cam, and/or some other type of input component.

Output 330 may permit device 300 to provide an output. For example, output 330 may include a display, light emitting diodes (LEDs), an output port, speakers, a vibratory mechanism, and/or some type of output component.

As described herein, device 300 may perform operations in response to processing system 305 executing software instructions contained in a computer-readable medium, such as memory/storage 310. The software instructions may be read into memory/storage 310 from another computer-readable medium or from another device via communication interface 320. The software instructions contained in memory/storage 310 may cause processing system 305 to perform processes described herein. Alternatively, hardwired circuitry may be used in place of or in combination with software instructions to implement processes described herein. Thus, implementations described herein are not limited to any specific combination of hardware circuitry and software.

As previously described, server 110 may receive and/or collect information from resource pool 105 and provide geo-tagged data to user devices 120 via network 115. Described below are exemplary functional components associated with server 110 that may perform these exemplary processes.

FIG. 4 is a diagram illustrating exemplary functional components associated with an exemplary implementation of server 110. As illustrated, server 110 may include a geo-data and metadata analyzer (GMA) 405, a geo-tagged data manager (GTDM) 410, and an information packager 415. GMA 405, GTDM 410, and/or information packager 415 may be implemented as a combination of hardware (e.g., processing system 305, etc.) and software (e.g., applications 315, etc.) based on the components illustrated and described with respect to FIG. 3. Alternatively, GMA 405, GTDM 410, and/or information packager 415 may be implemented as hardware based on the components illustrated and described with respect to FIG. 3.

GMA 405 may examine the information received from resource pool 105 and identify geographic data. GMA 405 may also examine the information and identify metadata. For example, GMA 405 may identify one or more types of metadata, such as, time parameters (e.g., start time, end time, etc.), date, or type of information. In an exemplary implementation, GMA 405 may categorize the information as news, sports, advertising, police alerts, traffic, etc. Depending on the format of the information received, GMA 405 may perform various processes, such as, for example, parsing, interpreting, etc., the information to identify the geographic data and the metadata.

GTDM 410 may manage a database that includes geo-tagged data. Additionally, GTDM 410 may control parameters associated with the geo-tagged data. By way of example, but not limited thereto, GTDM 410 may add metadata to geo-tagged data. For example, GTDM 410 may automatically assign a time expiration value for car accident information and a geographic region in which the geo-tagged data may be received by users. GTDM 140 may also manage updates to geo-tagged data. For example, GTDM 410 may automatically expand a geographic region associated with an AMBER alert when the missing person is not found within a certain period of time.

Information packager 415 may insert the geographic data and the metadata into particular fields of a packet. By way of example, but not limited thereto, the geographic data and the metadata may be inserted into one or more options fields and/or reserved fields associated with the packet. In an exemplary implementation, information packager 415 may encode the geographic data and the metadata into a particular format (e.g., a bit format or a byte format) so that downstream devices (e.g., in network 115 and user devices 120) may interpret the geographic data and metadata.

Although FIG. 4 illustrates exemplary functional components of server 110, in other implementations, server 110 may include fewer functional components, additional functional components, different functional components, and/or a different arrangement of functional components than those illustrated in FIG. 4 and described. Additionally, or alternatively, one or more operations described as being performed by a particular functional component may be performed by one or more other functional components, in addition to or instead of the particular functional component.

As previously described, user device 120 may receive geo-tagged data, identify the geographic data and the metadata, and determine whether to provide the geo-tagged data to the user. Additionally, in other embodiments, network devices in network 115 may perform similar processes. Described below are exemplary functional components associated with user device 120 and network devices in network 115 that may perform these exemplary processes.

FIG. 5 is a diagram illustrating exemplary functional components associated with an exemplary implementation of user device 120. As illustrated, user device 120 may include a geo-tagged data identifier (GTDI) 505 and a geo-tagged data filter (GTDF) 510. GTDI 505 and/or GTDF 510 may be implemented as a combination of hardware (e.g., processing system 305, etc.) and software (e.g., applications 315, etc.) based on the components illustrated and described with respect to FIG. 3. Alternatively, GTDI 505 and/or GTDF 510 may be implemented as hardware based on the components illustrated and described with respect to FIG. 3.

It will be appreciated that network devices in network 115 may include these functional components. For example, one or more network devices (e.g., BS 205, BSC 210, SGSN 220, GGSN 225, eNB 250, etc.) in the exemplary GSM/GPRS network or the LTE network may include these functional components. Further, in other implementations of network 115, not specifically illustrated and described, one or more network devices may include the functional components described. In this way, as previously described, filtering may be performed as geo-tagged data propagates from a backend of network 115 toward a frontend, access point, and/or network edge of network 115.

GTDI 505 may receive geo-tagged data and identify geographic data and metadata. By way of example, but not limited thereto, GTDI 505 may inspect one or more fields of a packet to identify whether geographic data and metadata is present. When the geographic data and the metadata are present, GTDI 505 may provide the geographic data and the metadata to GTDF 510. It will be appreciated, in one or more exemplary embodiments, geo-tagged data 140 may not include metadata, while in other exemplary embodiments, geo-tagged data 140 may include metadata.

GTDF 510 may determine whether the geo-tagged data should be provided to a user based on the geographic data and the metadata. As will be described in greater detail below, GTDF 510 may also consult user preferences to determine whether the geo-tagged data should be provided to the user.

In an exemplary implementation, GTDF 510 may obtain a location of user device 120 based on GPS 125. GTDF 510 may compare the location of user device 120 with the geographic data associated with geo-tagged data. Based on the comparison, GTDF 510 may determine whether user device 120 is within a geographic region pertaining to the geo-tagged data.

GTDF 510 may also consider the metadata. For example, when the metadata includes a time parameter (e.g., a start time, an end time, etc.) and/or date, GTDF 510 may determine whether these time parameters are satisfied. Additionally, GTDF 510 may also consider classification data. In an exemplary implementation, GTDF 510 may consider the classification data by comparing the classification data to user preferences. That is, the user may include user preferences which may filter out certain types or categories of information. For example, the user may not wish to receive advertisements from retailers, restaurants, etc., and/or weather information. Conversely, the user may wish to receive emergency weather reports that affect his or her home town regardless of where the user may be located at the time. For example, the user may travel frequently away from his or her home, but would like to receive emergency weather reports that affect his or her home. In this way, the user's ability to be provided with geo-tagged data may not be solely dictated by the user's location and/or other metadata parameters but may also be governed by a geographic location (e.g., the user's home geographic region) associated with user preferences.

In an exemplary implementation, user preferences may override other factors (e.g., geographic data and/or metadata) when determining whether to provide the geo-tagged data to the user. That is, user preferences may permit geo-tagged data to be provided or to not be provided to the user regardless of the geographic data and the metadata.

In the instance that GTDF 510 determines that the geo-tagged data should be provided to the user, GTDF 510 may cause the geo-tagged data to be output to the user (e.g., via output 330). For example, user device 120 may display the geo-tagged data and/or provide some other type of output, as previously described. Additionally, or alternatively, GTDF 510 may store the geo-tagged data so that the user may access the geo-tagged data at a later time. In the instance that GTDF 510 determines that the geo-tagged data should not be provided to the user, GTDF 510 may cause the geo-tagged data to not be output to the user. For example, the geo-tagged data may be deleted. In an exemplary implementation, however, user preferences may permit a user to save geo-tagged data. For example, the user may wish to review weather alerts as they move across the United States over time, or review the location of lightening strikes that occurred over some period of time, etc.).

Although FIG. 5 illustrates exemplary functional components of user device 120, in other implementations, user device 120 may include fewer functional components, additional functional components, different functional components, and/or a different arrangement of functional components than those illustrated in FIG. 5 and described. Additionally, or alternatively, one or more operations described as being performed by a particular functional component may be performed by one or more other functional components, in addition to or instead of the particular functional component.

Figure 6A:
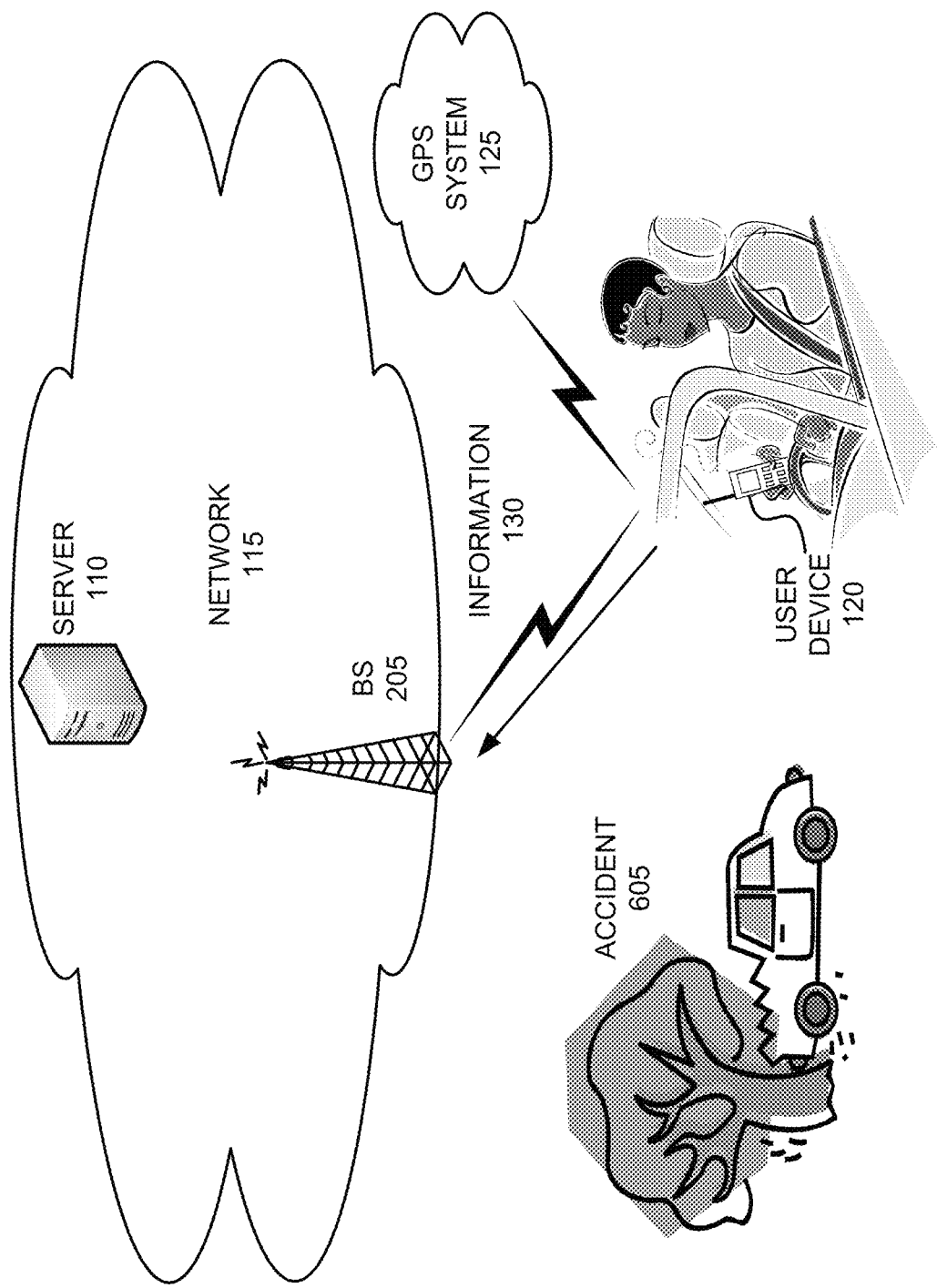
FIG. 6A is a diagram illustrating an exemplary scenario in which a user may upload geo-tagged data.

As previously described, resource pool 105 may include user generated data. For example, a user may upload information pertaining to a car accident, a speed trap, food special at a local restaurant, etc. FIG. 6A is a diagram illustrating an exemplary scenario in which the user may upload information to a server which may be broadcast, multicast, etc., to other users as geo-tagged data 140. As illustrated, assume that the user is traveling in her car and notices an accident 605 on the side of the highway. In such a situation, the user may upload information 130 to server 110 via BS 205. User device 120 may include an interface to permit the user to upload information 130. Information 130 may include data, such as, for example, location of accident 605, date and time of accident 605, number of vehicles in accident 605, etc. Based on the class of information (e.g., a car accident), when server 110 receives information 130, GTDM 410 of server 110 may automatically include an expiration time (e.g., 1 hour) as metadata to geo-tagged data 140. Additionally, or alternatively, GTDM 410 of server 110 may automatically limit the geographic region (e.g., a 10 mile radius) to which geo-tagged data 140 may be broadcast or multicast to other users. In this way, users within the limited geographic region and before the expiration time may be notified of accident 605.

In an exemplary embodiment, when user device 120 is close to the limited geographic region, but not within the limited geographic region, GTDF 510 of user device 120 may store geo-tagged data 140 for a certain period of time in case user device 120 moves within the limited geographic region. The determination of whether user device 120 is considered close to the limited geographic region may be based on user preferences or default values. In an exemplary implementation, user device 120 may be considered close when user device 120 is within several miles of the limited geographic region. By way of example, but not limited thereto, GTDF 510 may make re-determinations of whether geo-tagged data 140 may be provided to the user on a periodic basis or based on measurements of mobility associated with user device 120 (e.g., based on time and location values associated with user device 120).

As a further progression to this exemplary scenario, in the instance that accident 605 clears before the expiration time and traffic appears to be flowing normally, another user may upload an update for geo-tagged 140 to server 110, which may cause network 115 to stop broadcasting or multicasting the original geo-tagged data 140 that indicates the presence of accident 605. Additionally, or alternatively, an updated geo-tagged data 140 may be provided to users indicating that accident 605 has been cleared.

Figure 6B:
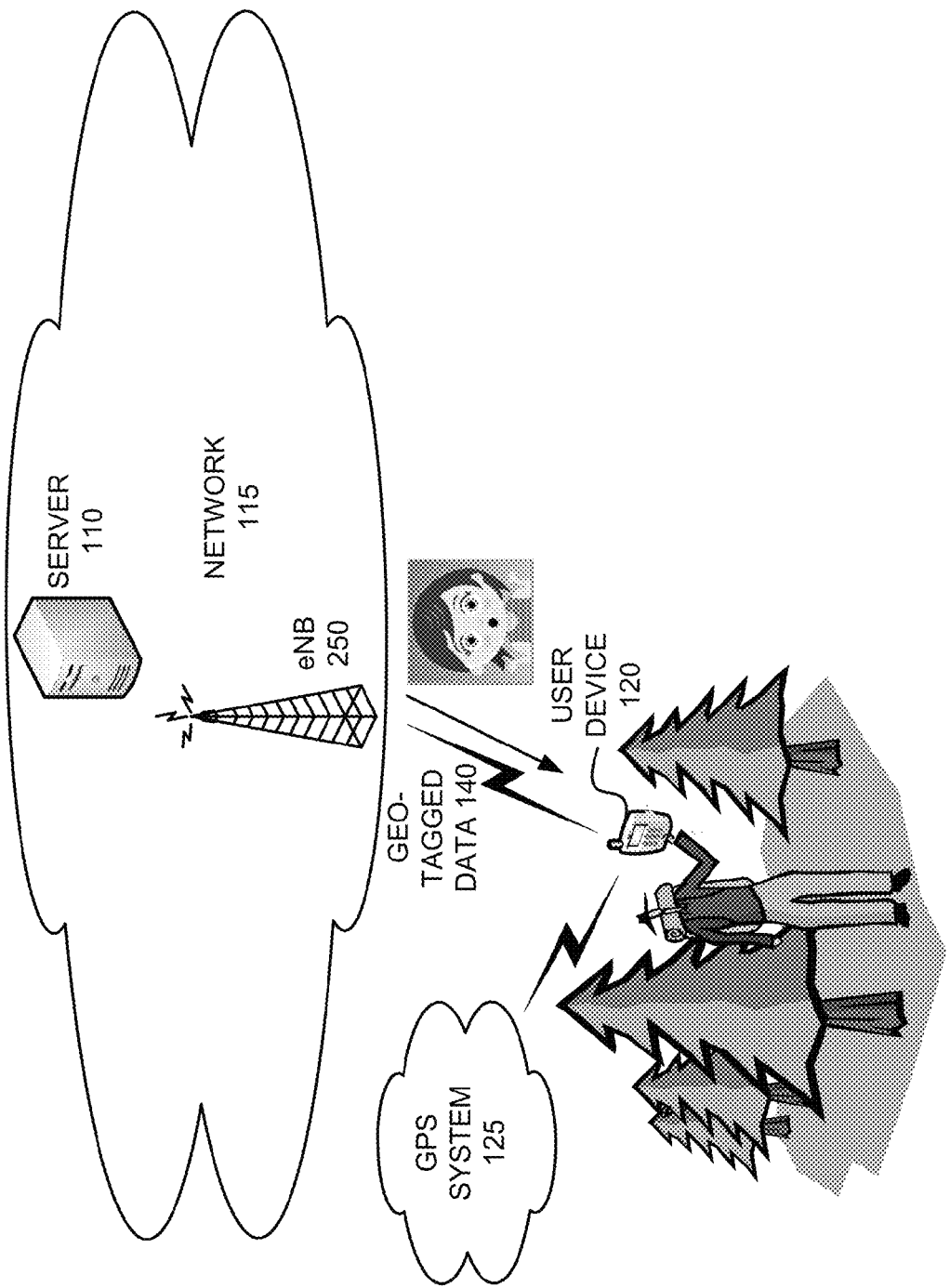
FIG. 6B is a diagram illustrating an exemplary scenario in which geo-tagged data may be implemented.

In another exemplary scenario, assume that an AMBER alert was issued for a missing child. Referring to FIG. 6B, assume that a user is beginning to take a hike in the woods. However, at that time, the user is not within a limited geographic region (e.g., 20 mile radius) associated with the AMBER alert. At such time, geo-tagged data 140 may be filtered by network 115 or user device 120. An hour later, the child is still not found. In an exemplary embodiment, GTDM 410 of server 110 may automatically update geo-tagged data 140 by expanding the limited geographic region (e.g., to a 100 mile radius). At such time, geo-tagged data 140 may not be filtered by network 115 or user device 120 and user device 120 may provide geo-tagged data 140 to the user.

Figure 6C:
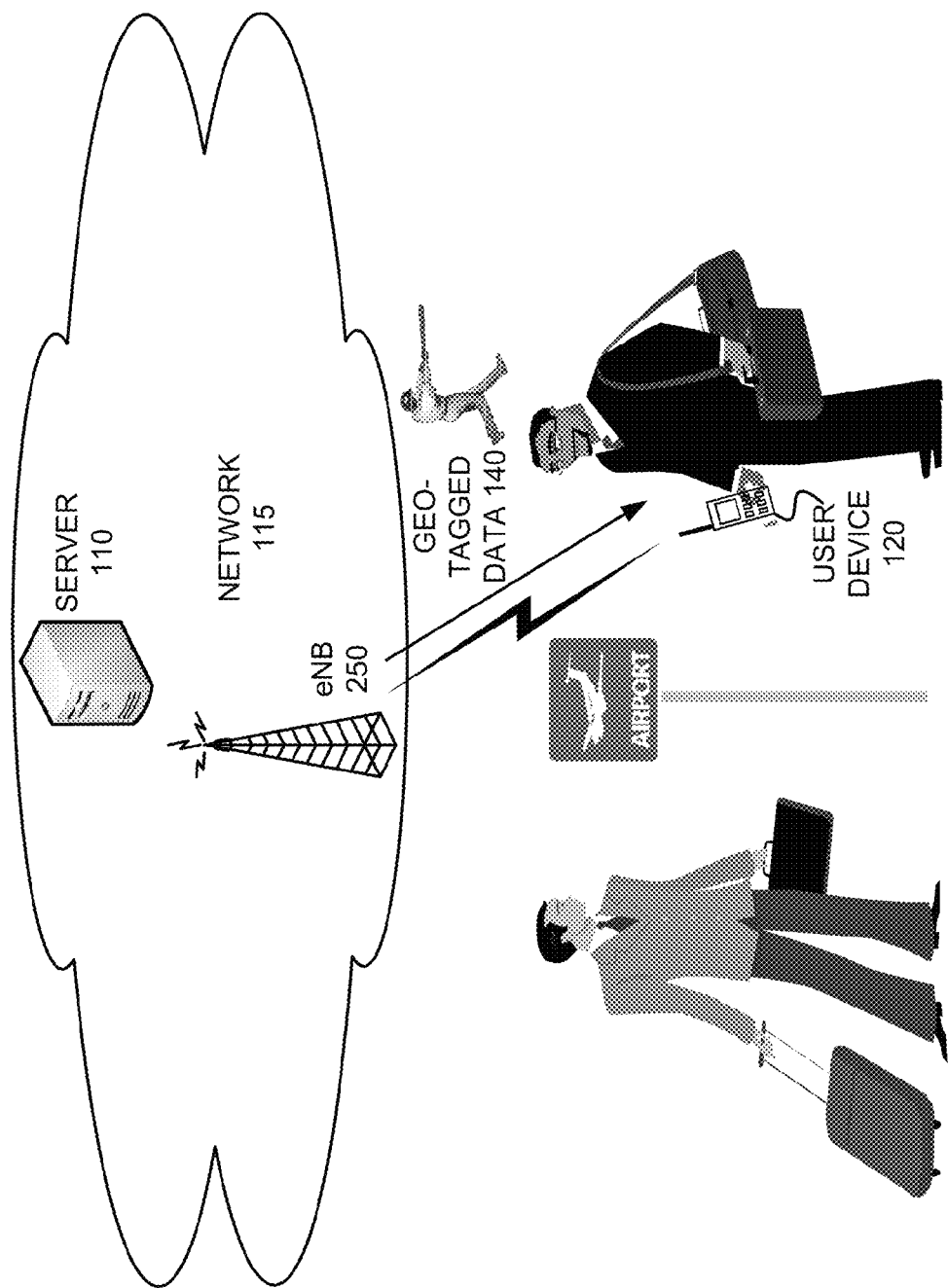
FIG. 6C is a diagram illustrating another exemplary scenario in which geo-tagged data may be implemented.

In yet another exemplary scenario, assume that a user is traveling on business and is located in an airport in New York. However, the user may reside in Massachusetts. As illustrated in FIG. 6C, eNB 250 may provide geo-tagged data 140 to user device 120. For example, geo-tagged data 140 may correspond to sports information (e.g., baseball scores).

In an exemplary implementation, network 115 may provide sports information with the geographic data indicating a national level (i.e., geo-tagged data 140 may be broadcast to all users in the United States). In such an implementation, users located in a particular geographic region may receive sports scores for their home team. For example, users residing in New York may receive a sports score for the New York Yankees. That is, in an exemplary implementation, user device 120 may automatically filter all the sports scores in geo-tagged data 140, based on the location of user device 120, to provide the user with only the sports score for the New York Yankees. In this exemplary scenario, however, the user may be interested in the sports score for the Boston Red Sox versus the New York Yankees, despite the fact that the user is currently in the airport in New York. In such an implementation, the user may have user preferences configured such that user device 120 may filter geo-tagged data 140 so that the sports score for the Boston Red Sox versus the New York Yankees may be provided to the user since the user resides in Massachusetts. In this way, as previously described, the user's ability to be provided with geo-tagged data 140 may not be solely dictated by the user's location and/or other metadata parameters.

Figure 7:
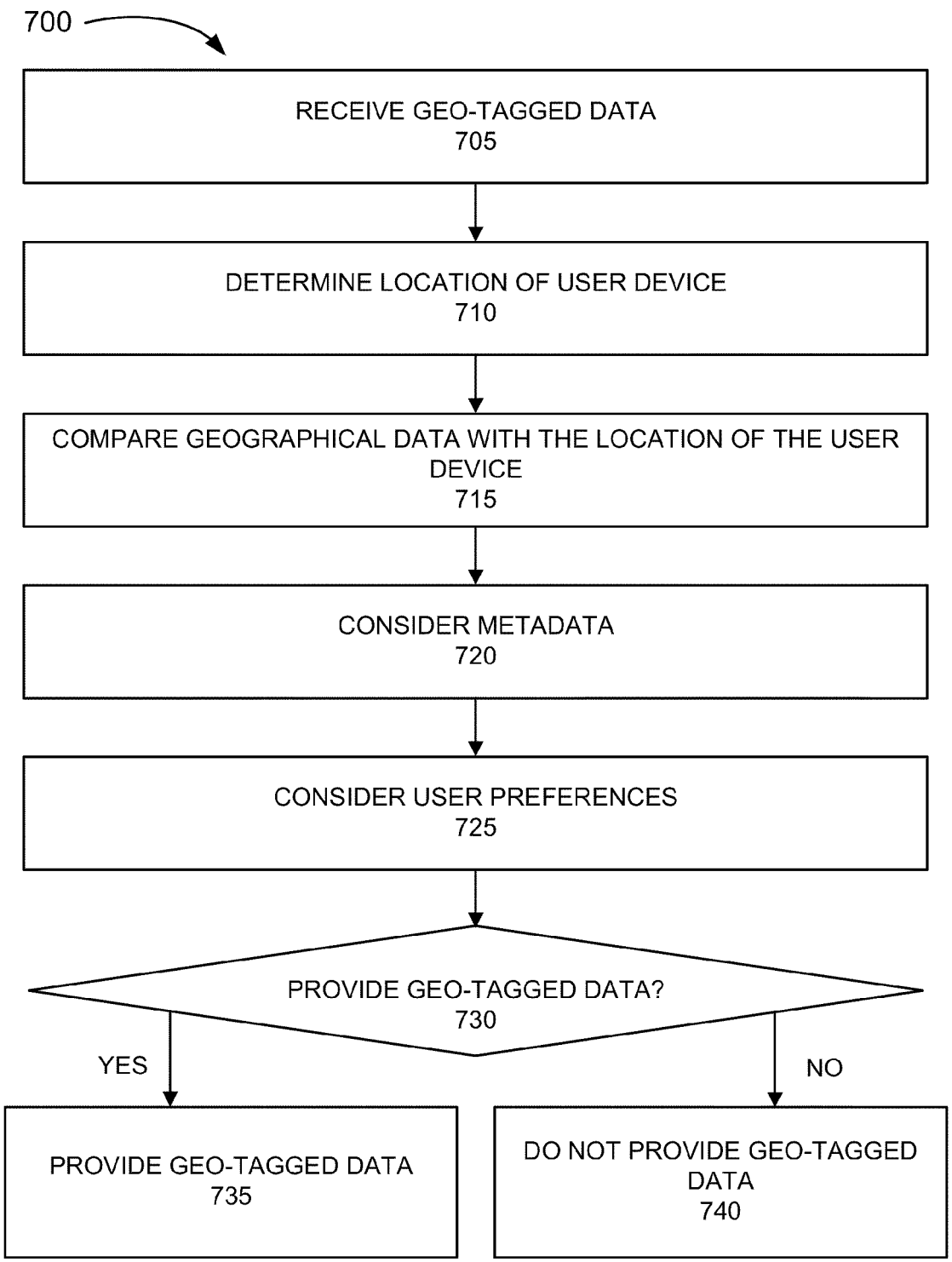
FIG. 7 is a flow diagram illustrating an exemplary process for filtering geo-tagged data.

FIG. 7 is a flow diagram illustrating an exemplary process 700 for filtering geo-tagged data. In an exemplary implementation, process 700 may be performed by user device 120.

Process 700 may begin by receiving geo-tagged data (block 705). For example, user device 120 may receive geo-tagged data 140 from network 115. GTDI 505 of user device 120 may inspect one or more fields of the packets to identify whether geographic data and metadata is present. When the geographic data and the metadata are present, GTDI 505 may provide the geographic data and the metadata to GTDF 510. It will be appreciated, in one or more exemplary embodiments, geo-tagged data 140 may not include metadata, while in other exemplary embodiments, geo-tagged data 140 may include metadata.

A location of a user device may be determined (block 710). For example, in an exemplary implementation, user device 120 may obtain a geographic location of user device 120 based on GPS 125. In other implementations, user device 120 may obtain the geographic location of user device 120 based on other methods (e.g., cellular positioning methods (e.g., triangulation, etc.), local positioning methods (e.g., Bluetooth, IEEE 802.11, Ultra Wide Band, etc.)), etc.

Geographic data may be compared with the location of the user device (block 715). For example, as previously described, GTDF 510 may determine whether geo-tagged data 140 should be provided to the user based on the geographic data and the location of user device 120. In an exemplary implementation, GTDF 510 may compare the location of user device 120 with the geographic data associated with geo-tagged data 140. Based on such a comparison, GTDF 510 may determine whether user device 120 is within a geographic region pertaining to geo-tagged data 140.

Metadata may be considered (block 720). For example, GTDF 510 may consider metadata, if present, to determine whether geo-tagged data 140 may be provided to a user. For example, as previously described, the metadata may include a time parameter, a date, and/or classification data.

User preferences may be considered (block 725). For example, GTDF 510 may consider user preferences configured on user device 120. As previously described, in an exemplary implementation, GTDF 510 may compare the classification data with user preferences. In this way, GTDF 510 may filter certain types or categories of geo-tagged data 140. In an exemplary implementation, user preferences may override other factors (e.g., geographic data and/or metadata) when determining whether to provide the geo-tagged data to the user.

It may be determined whether the geo-tagged data should be provided (block 730). As previously described, in an exemplary implementation, GTDF 510 may determine whether geo-tagged data 140 should be provided to the user based on the geographic data, the metadata, and the user preferences. In other exemplary implementations, GTDF 510 may determine whether geo-tagged data 140 should be provided to the user based on the geographic data and, one or more of the metadata or the user preferences.

If it is determined that the geo-tagged data should be provided (block 730—YES), the geo-tagged data may be provided (block 735). For example, GTDF 510 may cause geo-tagged data 140 to be output to the user. For example, user device 120 may display geo-tagged data 140 to the user and/or provide some other type of output (e.g., via output 330). For example, user device 120 may provide geo-tagged data 140 in an auditory form (e.g., a vocalization of geo-tagged data 140) or some other type of auditory output (e.g., an auditory alert or cue) to the user. Additionally, or alternatively, user device 120 may provide a tactile output (e.g., a vibratory cue) or some type of visual cue (e.g., flashing lights, etc.). Additionally, or alternatively, GTDF 510 may store geo-tagged data 140 so that the user may access geo-tagged data at a later time. By way of example, but not limited thereto, when GTDF 510 determines user device 120 is in close proximity, but not within a geographic region corresponding to the geographic data, GTDF 510 may store geo-tagged data 140 and re-determine whether geo-tagged data 140 may be provided to the user at a later time.

Depending on the information (e.g., news, sports, weather, etc.) included with geo-tagged data, the information may be provided to the user as a feed, a text message, a video or some other type of multimedia message (e.g., a recorded message, etc.), etc.

If it is determined that the geo-tagged data should not be provided (block 730—NO), the geo-tagged data may not be provided (block 740). For example, GTDF 510 may prevent geo-tagged data 140 from being provided to the user. GTDF 510 may also delete geo-tagged data 140.

Although FIG. 7 illustrates an exemplary process 700 for filtering geo-tagged data, in other implementations, process 700 may include additional operations, fewer operations, and/or different operations than those illustrated in FIG. 7 and described.

Figure 8:
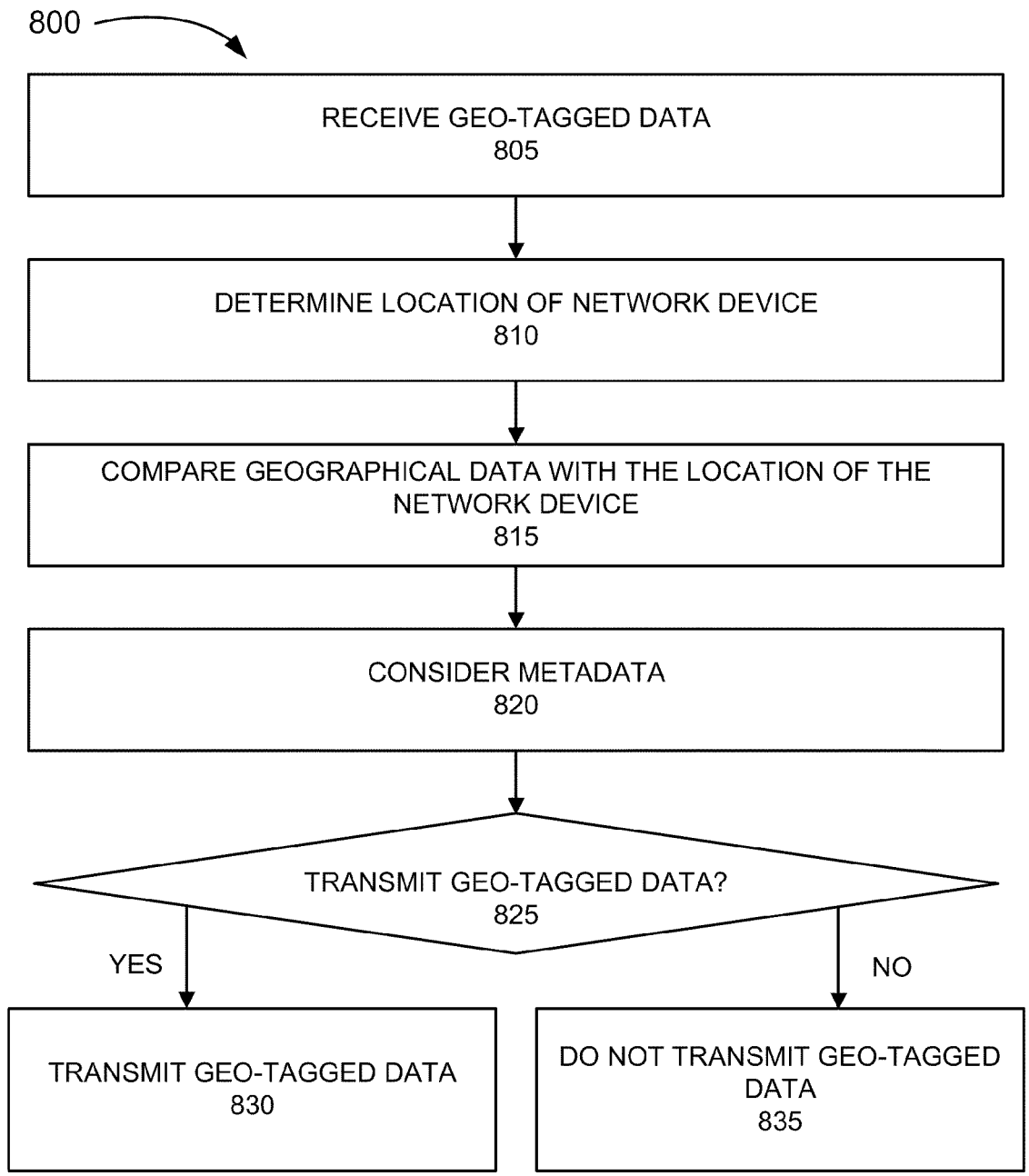
FIG. 8 is a flow diagram illustrating another exemplary process for filtering geo-tagged data.

FIG. 8 is a flow diagram illustrating another exemplary process for filtering geo-tagged data. In an exemplary implementation, process 800 may be performed by a network device in network 115. For example, the network device may correspond to BS 205, BSC 210, SGSN 220, GGSN 225, eNB 250, etc., in the exemplary GSM/GPRS network or the LTE network, or other types of network devices.

Process 800 may begin by receiving geo-tagged data (block 805). For example, the network may receive geo-tagged data 140 from server 110 or from another network device in network 115. GTDI 505 of the network device may inspect one or more fields of the packets to identify whether geographic data and metadata is present. When the geographic data and the metadata are present, GTDI 505 may provide the geographic data and the metadata to GTDF 510. It will be appreciated, in one or more exemplary embodiments, geo-tagged data 140 may not include metadata, while in other exemplary embodiments, geo-tagged data 140 may include metadata.

A location of a network device may be determined (block 810). For example, in an exemplary implementation, the network device may store its geographic location since the network device may be a stationary device.

Geographic data may be compared with the location of the network device (block 815). For example, as previously described, GTDF 510 may determine whether geo-tagged data 140 should be transmitted to a downstream network device or to user device 120 based on the geographic data and the location of the network device. In an exemplary implementation, GTDF 510 may compare the location of the network device with the geographic data associated with geo-tagged data 140. Based on such a comparison, GTDF 510 may determine whether the network device is within a geographic region pertaining to geo-tagged data 140.

Metadata may be considered (block 820). For example, GTDF 510 may consider metadata, if present, to determine whether geo-tagged data 140 should be transmitted to a downstream network device or to user device 120. For example, as previously described, the metadata may include a time parameter, a date, etc.

It may be determined whether the geo-tagged data should be transmitted (block 825). As previously described, in an exemplary implementation, GTDF 510 may determine whether geo-tagged data 140 should be transmitted to a downstream network device or to user device 120 based on the geographic data and the metadata.

If it is determined that the geo-tagged data should be transmitted (block 825—YES), the geo-tagged data may be transmitted (block 830). For example, GTDF 510 may cause geo-tagged data 140 to be transmitted.

If it is determined that the geo-tagged data should not be transmitted (block 825—NO), the geo-tagged data may not be transmitted (block 835). For example, GTDF 510 may prevent geo-tagged data 140 from being transmitted. GTDF 510 may also delete geo-tagged data 140.

Although FIG. 8 illustrates an exemplary process 800 for filtering geo-tagged data, in other implementations, process 800 may include additional operations, fewer operations, and/or different operations than those illustrated in FIG. 8 and described.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 7 and 8, the order of the blocks may be modified in other implementations. Further, non-dependent blocks may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" that performs one or more functions. This logic may include hardware, such as one or more processors, one or more microprocessors, one or more ASICs, one or more FPGAs, etc., software, or a combination of hardware and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:
   storing, by the user device, user preferences input by a user of the user device, wherein the user preferences include parameters governing whether information tagged with geographic data is to be provided to the user of the user device;
   receiving geo-tagged data by a user device and from a network, wherein the geo-tagged data includes information tagged with geographic data;
   determining, by the user device, a geographic location of the user device in response to the receiving;
   comparing, by the user device, the geographic data with the geographic location;
   evaluating, by the user device, user preferences relative to the information and the geographic data;
   determining, by the user device, whether the information is to be provided to a user associated with the user device based on the comparing and the evaluating;
   providing, by the user device, the information to the user when the geographic location is within a geographic region indicated by the geographic data and the user preferences allow the information to be provided; and
   determining not to provide, by the user device, the information to the user when the geographic location is not within the geographic region indicated by the geographic data and the user preferences do not allow the information to be provided.

2. The method of claim 1, wherein the information includes at least one of weather information, sports information, news information, police-based information, traffic-based information, advertising information, proprietary information, or user-generated information.

3. The method of claim 1, wherein the geo-tagged data includes metadata, wherein the metadata includes a time parameter and the determining whether the information is to be provided to the user comprises:
   evaluating the time parameter; and
   providing the information to the user when the time parameter is satisfied.

4. The method of claim 3, wherein the metadata includes classification data that categorizes the information and wherein the determining whether the information is to be provided to the user comprises:
   evaluating the classification data; and
   providing the information to the user when the classification data is satisfied.

5. The method of claim 4, further comprising:
   comparing the user preferences to the classification data; and wherein the determining whether the information is to be provided to the user comprises:
   determining whether the user preferences permit a category of information indicated by the classification data to be provided to the user.

6. The method of claim 5, wherein if the user preferences do not permit the category of information to be provided to the user, the information is not provided to the user even when the geographic location is within the geographic region indicated by the geographic data, or wherein the user preferences permit the information to be provided to the user according to a geographic region associated with the user preferences.

7. The method of claim 1, wherein the providing the information comprises at least one of displaying the information, providing an auditory output, or providing a tactile output.

8. A method comprising:
   receiving geo-tagged data by a network device, wherein the geo-tagged data includes information and geographic data, and wherein the geographic data indicates a geographic region for the information;
   determining, by the network device, a geographic location of the network device in response to receiving the geo-tagged data;
   comparing, by the network device, the geographic data with the geographic location;
   determining, by the network device, whether to transmit the geo-tagged data to another network device or to a user device based on the comparing; and
   transmitting, by the network device, the geo-tagged data to the other network device or to the user device when the geographic location is within the geographic region indicated by the geographic data, wherein the user device corresponds to a mobile device, and the network device does not correspond to a user device.

9. The method of claim 8, wherein the geo-tagged data is received on a broadcast data channel destined to users, and the network device corresponds to a base station, a base station controller, a gateway, or an evolved node B.

10. The method of claim 8, further comprising:
   omitting to transmit the geo-tagged data to the other network device or to the user device when the geographic location is not within a geographic region indicated by the geographic data.

11. The method of claim 8, wherein the geo-tagged data includes metadata, and the method further comprising:
   determining whether to transmit the geo-tagged data to another network device or to the user device based on the metadata.

12. The method of claim 11, wherein the metadata includes classification data that categorizes the geo-tagged data, and the method further comprising:
   evaluating the classification data; and
   determining whether to transmit the geo-tagged data to another network device or to the user device based on the classification data.

13. The method of claim 8, wherein the geo-tagged data pertains to at least one of weather information, sports information, news information, police-based information, traffic-based information, advertising information, proprietary information, or user-generated information.

14. A user device comprising:
   a communication interface;
   one or more memories to store instructions; and
   one or more processors to execute the instructions in the one or more memories to:
      store user preferences input by a user of the user device, wherein the user preference include parameters governing whether information tagged with geographic data is to be provided to the user of the user device;
      receive, via the communication interface, geo-tagged data, wherein the geo-tagged data includes information and geographic data;
      determine a geographic location of the user device in response to receiving the geo-tagged data;
      evaluate user preferences relative to the information and the geographic data;
      compare the geographic data with the geographic location;
      determine whether the information is to be provided to a user associated with the user device based on the comparing and the user preferences;
      output the information to the user when the geographic location is within a geographic region indicated by the geographic data and the user preferences allow the information to be output; and
      determine not to output the information to the user when the geographic location is not within the geographic region indicated by the geographic data and the user preferences do not allow the information to be output.

15. The user device of claim 14, wherein the user device includes a mobile telephone.

16. The user device of claim 14, wherein the geo-tagged data includes metadata that includes classification data which categorizes the information and when the one or more processors execute the instructions to determine whether the information is to be provided to the user, the one or more processors further execute the instructions to:
   evaluate the classification data; and
   provide the information to the user when the classification data satisfies one of the user preferences configured on the user device.

17. The user device of claim 14, wherein the geo-tagged data is received on a broadcast channel.

18. The user device of claim 14, wherein the information includes at least one of weather information, sports information, news information, police-based information, traffic-based information, advertising information, or user-generated information.

19. The user device of claim 14, wherein the one or more processors execute the instructions to:
   inspect one or more fields of a packet to identify whether the geographic data and metadata is present; and
   access the user preferences configured on the user device to determine whether the information is to be provided to the user.

20. The user device of claim 14, wherein the user device corresponds to a mobile user device, and the one or more processors execute the instructions to:

determine that the location of the user device is not within the geographic region indicated by the geographic data;

determine that the location is in close proximity to the geographic region indicated by the geographic data;

store the geo-tagged data;

determine a second geographic location of the user device after a period of time;

compare the geographic data with the second geographic location; and output the information to the user when the second geographic location is within the geographic region indicated by the geographic data.

* * * * *